United States Patent [19]

Corey

[11] Patent Number: 5,315,221
[45] Date of Patent: May 24, 1994

[54] MOTOR CONTROL WITH CONTACT WELD SENSOR AND INTERRUPTER

[75] Inventor: Lawrence C. Corey, Smithfield, N.C.

[73] Assignee: Eaton Corporation, Cleveland, Ohio

[21] Appl. No.: 976,865

[22] Filed: Nov. 16, 1992

[51] Int. Cl.$^5$ ............................................. H02K 17/32
[52] U.S. Cl. .................................................... 318/434
[58] Field of Search ........................................ 318/434

[56] References Cited

U.S. PATENT DOCUMENTS

| | | | |
|---|---|---|---|
| 4,980,624 | 12/1990 | Bernhardt | 318/434 |
| 5,025,198 | 6/1991 | Mordue et al. | 318/434 |
| 5,039,926 | 8/1991 | Marishita et al. | 318/434 |
| 5,051,670 | 9/1991 | De Piola | 318/434 |
| 5,126,643 | 6/1992 | French | 318/434 |
| 5,214,359 | 5/1993 | Herndon et al. | 318/434 |
| 5,225,751 | 7/1993 | Kusano et al. | 318/434 |

Primary Examiner—William M. Shoop, Jr.
Assistant Examiner—Karen Masih
Attorney, Agent, or Firm—L. Vande Zande

[57] ABSTRACT

A first pole of a double pole switch selectively connects a battery to a motor in one switch condition and disconnects the motor and battery in a second switch condition, wherein a second switch pole connects a dynamic braking circuit around the motor. In the event contacts of the first pole weld closed and fail to open in the second switch condition, the second pole connects the fuse directly to the battery in shunt of the motor to cause the fuse to blow and open the circuit to the motor. Alternative embodiments incorporate time delays between switch operation and blowing of the fuse by incorporating a thermistor or an R-C timing circuit.

11 Claims, 2 Drawing Sheets

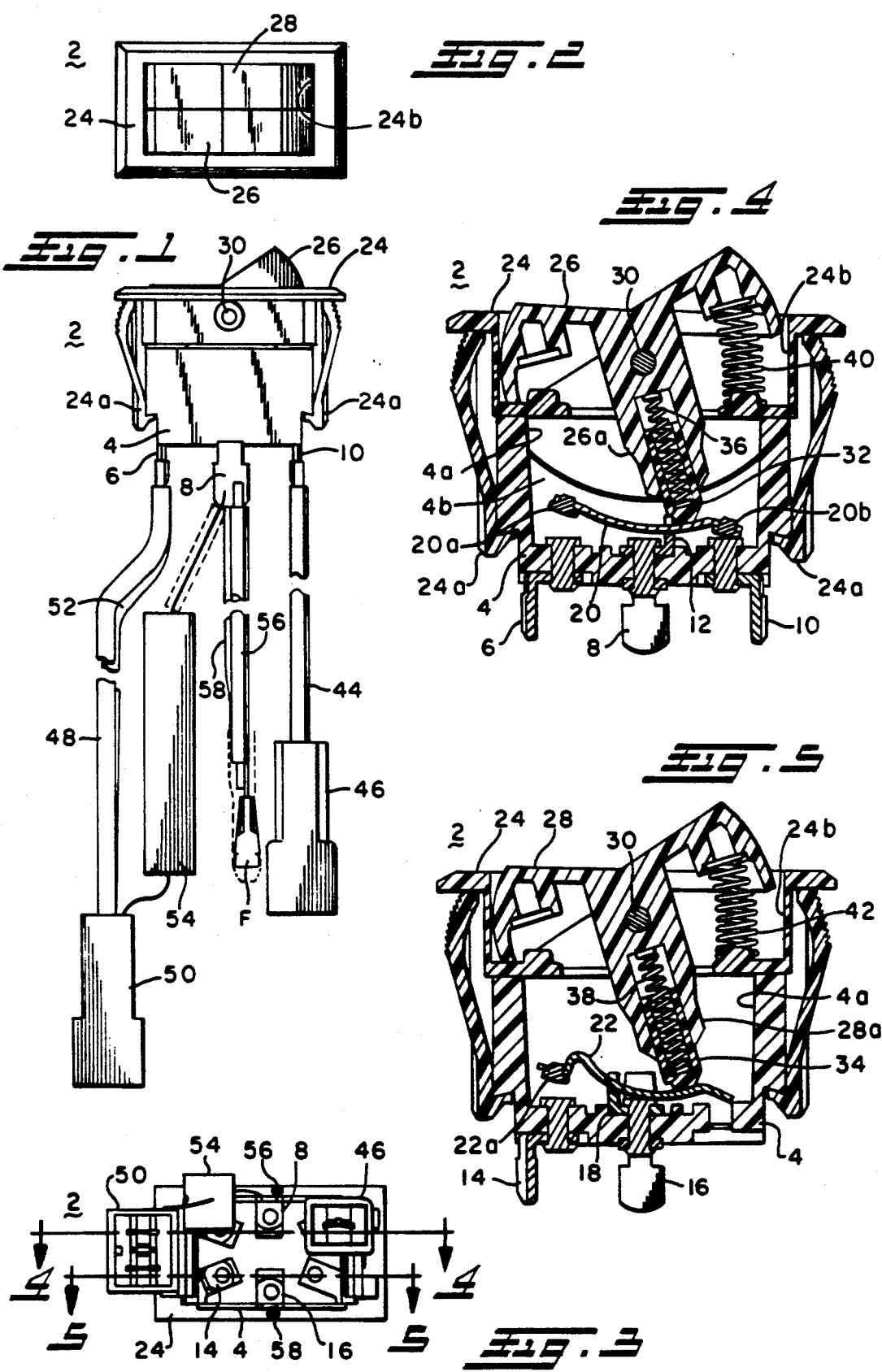

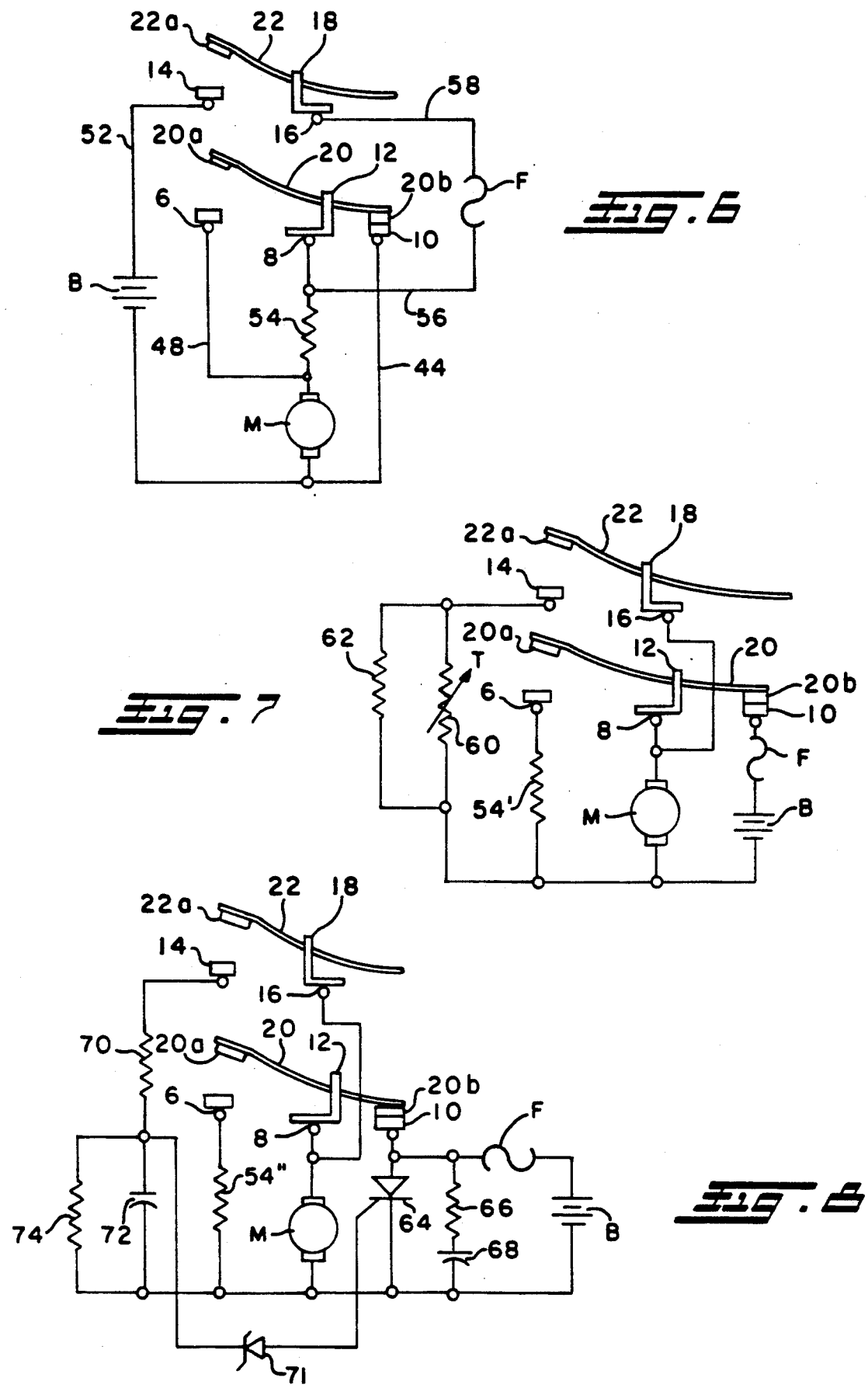

MOTOR CONTROL WITH CONTACT WELD SENSOR AND INTERRUPTER

BACKGROUND OF THE INVENTION

This invention relates to a motor control system and to apparatus used in such motor control system. In particular, the invention relates to a motor control which responds to a welded closed condition of switch contacts in the motor control to open the circuit to the motor. The invention further relates to a switch which is particularly well adapted for use in this motor control.

A welded contact in a switch used to control the starting and stopping of an electric motor can cause that motor to continue to run after the switch has supposedly been operated to an "OFF" position. This condition is undesirable, and in some applications of motor control, can be dangerous. For example, if the motor control is used in an electric driven vehicle and the vehicle continues to be propelled after the switch has been operated to an OFF position, occupants of the vehicle could be in danger.

SUMMARY OF THE INVENTION

This invention provides a motor control which responds to a welded closed condition of switch contacts and opens the circuit to the motor when the switch is operated to ordinarily cause the contacts to move to an OPEN condition. This is accomplished by utilizing a double pole switch (or a pair of similar single pole switches mounted in close side-by-side relation) wherein one pole connects the motor to a power source and the other pole connects a fuse link directly across the power source in the event the contacts of the first pole are welded shut. The current in the direct connection between power source and fuse is sufficient to cause the fuse to blow, thereby opening the circuit.

In a preferred application the power source is a D.C. battery and full current is applied to the fuse immediately upon operation of the switch. Alternative embodiments are also provided within this invention which incorporate a time delay between operation of the switch and application of full current to the fuse. In a first alternate embodiment a thermistor is connected in circuit with the fuse, reducing the resistance thereof as current flow causes it to heat up, until current flow through the diminishing resistance is sufficient to blow the fuse. In a second alternate embodiment, a switching semiconductor is inserted in circuit with the fuse and battery and is controlled by an R-C timing circuit in the semiconductor gate circuit.

The invention, its features and advantages, will be more readily understood when reading the following description and claims in conjunction with the accompanying drawings.

BRIEF DESCRIPTION OF THE DRAWINGS

FIG. 1 is a side elevational view of motor control comprising a switch constructed in accordance with this invention;

FIG. 2 is a top plan view of the switch shown in FIG. 1;

FIG. 3 is a bottom plan view of the motor control and switch motor control shown in FIG. 1;

FIG. 4 is a cross sectional view taken along the line 4—4 in FIG. 3 showing one pole of the switch in one of two operating conditions thereof;

FIG. 5 is a cross sectional view taken along the line 5—5 in FIG. 3 showing a second pole of the switch in a first of two operating conditions thereof;

FIG. 6 is a schematic diagram of the motor control of this invention;

FIG. 7 is a schematic diagram of an alternate embodiment of a motor control constructed according to this invention; and FIG. 8 is a schematic diagram of another alternate embodiment of a motor control constructed according to this invention.

DETAILED DESCRIPTION OF THE PREFERRED EMBODIMENTS

A switch 2 which is a major component of the motor control of this invention is shown in FIGS. 1-5. Switch 2 is shown in side elevation in FIG. 1 and includes a wiring harness and certain components of the motor control which will be described later. Switch 2 is a two-pole rocker switch comprising a molded insulating base 4 having a central chamber 4a divided into two cavities by a central wall 4b having an arcuate upper edge. Within a cavity defining one pole of the base are provided stationary contact assemblies 6, 8 and 10 as seen in FIG. 4. Each of the stationary contact assemblies comprises a rivet having the head end disposed within the base cavity and extending through an opening in the bottom wall of the base and through a hole in a corresponding external terminal member of the respective assembly. The end of the respective rivet protruding beyond the terminal member is riveted over to tightly secure the rivet and terminal to the base. As can be seen in FIG. 4, the heads of the rivets for stationary contact assemblies 6 and 10 serve as stationary contact elements for the switch. The rivet of central contact assembly 8 also extends through a hole in a horizontal leg of an L-shaped pivotal support contact 12 disposed within the base cavity to tightly secure that support contact to the bottom wall of the base. As seen in FIG. 5, the cavity for the other pole of switch 2 contains a stationary contact assembly 14 disposed at an end corresponding to stationary contact assembly 6 and a central contact assembly 16 having an L-shaped pivotal support contact 18 secured within the cavity of base 4 by the respective rivet.

A movable contact 20 having contact elements 20a and 20b at opposite ends thereof is rockably positioned on the vertical leg of pivotal support contact 12 in the switch pole shown in FIG. 4. Pivotal or rocking movement of movable contact 20 on support contact 12 will bring the movable contact elements 20a and 20b into and out of engagement with contact element heads of the rivets of stationary contact assemblies 6 and 10, respectively. A movable contact 22 having a movable contact element 22a at one end thereof is pivotally supported on support contact 18 in the switch pole shown in FIG. 5. The opposite end of movable contact 22 has no contact element and merely comes to rest on the bottom wall of the base in one operating position of the movable contact, while the contact element 22a moves into and out of engagement with the contact element head of the rivet for stationary contact assembly 14.

Chamber 4a of base 4 is open to the upper side of the base. A molded insulating frame 24 is attached over the open side of the base 4 by resilient fingers 24a which extend down along the ends of base 4 and have hooks at the distal ends thereof which engage with ledges of the base near the bottom thereof. Frame 24 has a recessed pocket 24b which receives a pair of rocker actuators 26 and 28 therein, the actuators being pivotally supported on a pin 30 which extends through each of the rockers and is fixed in opposite side walls of frame 24. Each of the rockers has a depending leg 26a, 28a, respectively, which has a longitudinal hole open to the bottom thereof for receiving a respective tubular plunger 32, 34 and helical compression springs 36, 38 for biasing the respective plunger outwardly of the bottom of the respective rocker 26, 28. Semispherical ends of the plungers 32, 34 rest on the top surface of respective movable contacts 20, 22, respectively.

A pair of helical compression springs 40, 42 are disposed in the recess 24b of frame 24 at one end of the respective rockers 26, 28 to bias the rockers in a counterclockwise direction to one extreme operating position of the respective poles. As seen in FIG. 4, the normal operating condition of one switch pole as determined by spring 40 causes movable contact element 20b to be closed upon the rivet head of stationary contact assembly 10 and the movable contact element 20a to be separated from the rivet head of stationary contact assembly 6. The normal operating condition of the other pole determined by spring 42 as shown in FIG. 5 causes movable contact element 22a to be separated from the contact head of stationary contact assembly 14. The rocker actuators 26, 28 can readily be simultaneously actuated to the opposite operating condition whereupon the respective plungers 32, 34 slide along the upper surfaces of the respective movable contacts 20, 22, causing the plungers to move over-center of the respective pivotal support contacts 12, 18 and thereby cause the respective movable contact to rock to an alternate operating position. It will be noted in comparing FIGS. 4 and 5 that the pivotal support contact 12 is reversely oriented with respect to the pivotal support contact 18 whereby the vertical support leg of contact 12 is to the right of the rivet whereas the vertical support leg of contact 18 is to the left of the rivet. Thus the plunger 32 of rocker 26 in one pole crosses over the pivot for the respective movable contact 20 much earlier in the movement of the actuator than does the plunger 34 in actuator 28 riding along the movable contact 22. This insures that movable contact element 20a closes upon the respective stationary contact assembly 6 before movable contact element 22a closes upon stationary contact assembly 14 when the respective rocker actuators 26 and 28 are moved in unison. The reverse sequence of contact operation occurs when the respective actuators are returned to their original positions as shown in the drawings.

It is customary and usual to provide a double-pole rocker switch with a single unitary rocker actuator having separate depending legs extending into the respective poles. However, this invention is directed toward the possibility that contacts of one pole may weld and it is desirable that the contacts of the other pole not be affected in that situation by a rocker actuator that may resist returning to an unactuated position or a spring biased position by virtue of the welded contacts. Thus while both actuators 26 and 28 can be operated simultaneously, they each are capable of operation independently of the other.

Referring now also to FIGS. 1, 3 and 6, the motor control of this invention further comprises a wiring harness welded or otherwise attached to the terminals of stationary contact assemblies of switch 2 and to a battery B and motor M. A wire 44 and one-way harness connector 46 is attached to the terminal of stationary contact assembly 10 for connection to one side of the motor m which is also connected to one side of the battery B. A wire 48 connected to the terminal of stationary contact assembly 6 has a two-way harness plug-in connector 50 at its distal end. A wire 52 (FIG. 6) is connected at one end to the terminal of stationary contact assembly 14 and also connected at its distal end to the two-way harness connector 50 for connection through the harness to the other side of the battery B. The lower lead of a dynamic braking resistor 54 is connected to wire 48 at the connector 50. The upper lead of resistor 54 is welded to the terminal of stationary contact assembly 8. A wire 56 is welded to the terminal of stationary contact assembly 8 and a wire 58 is welded to the terminal of stationary contact assembly 16. The distal ends of wires 56 and 58 are welded to the opposite terminals of a fuse link F which may be, for example, an automotive type double-bladed fuse. Shrink wrap tubing as represented by dotted lines is provided over the fuse F and the connected ends of wires 56 and 58 and surrounding the upper lead of resistor 54 between the resistor and the connection to contact assembly 8.

The motor control of this invention has particular applicability to electric powered carts and vehicles wherein the battery B provides DC power to the motor M for propelling the vehicle. The fuse F is placed in circuit with the battery and motor. Operation of the rockers 26 and 28 of switch 2 from the positions shown in FIGS. 4 and 5 against the bias of springs 40 and 42 to the opposite extreme operating condition thereof causes contact 20a to close on contact 6 and subsequently contact 22a to close on contact 14, the latter connecting the battery B to the motor M through the fuse F. Wire 56, contact assemblies 8 and 6, movable contact 20 and wire 48, connect motor m to battery B through fuse F directly around resistor 54. When operating pressure on the actuators 26, 28 is released and the switch 2 is permitted to return to its normal position as determined by springs 40, 42, movable contact 22 operates first to separate movable contact element 22a from stationary contact 14, thereby disconnecting battery power from the motor M. Movable contact 20 operates subsequently to separate movable contact element 20a from stationary contact 6, and to close movable contact element 20b upon stationary contact 10, thereby connecting a closed loop regenerative circuit around motor M, the circuit including dynamic braking resistor 54 for rapid stopping of the motor M. The closed loop regenerative path comprises motor M, resistor 54, stationary contact assemblies 8 and 10, movable contact 20 and wire 44. The resistor 54 provides dynamic braking to the motor M for rapid stopping of the motor and the vehicle when the battery power is disconnected from the motor. However, in the event that movable contact element 22a and stationary contact assembly 14 directly connected to battery B should weld and fail to open upon movement of rocker actuator 28 to the normal position as represented in FIG. 5, power from battery B would continue to be supplied to motor M and the vehicle would fail to stop in response to operation of the control. This could create a potentially hazardous situation and it is to this condition and the detection of such contact weld that this invention is particularly directed.

As described hereinbefore, wire 44 is connected directly between stationary contact assembly 10 at one side of motor M. In the event that movable contact element 22a and stationary contact 14 are welded and remain closed after operation of the rocker actuators to the spring biased positions shown in FIGS. 4 and 5, fuse F is directly connected across battery B by wire 44, stationary contact assemblies 8 and 10, and movable contact 20. The increased current through fuse F when the motor M is taken out of circuit with the battery by the shunt circuit aforedescribed causes fuse F to blow, thereby opening the circuit between the motor and the battery. The fuse F is made non-replaceable to require that the entire motor control be replaced inasmuch as the fuse had blown in response to a fault condition of the contacts in the first place.

FIGS. 7 and 8 show alternate embodiments of the motor control of this invention wherein a time delay is provided before the fuse F blows. Like parts shown in FIGS. 6, 7 and 8 have been given like reference numbers. The embodiment shown in FIG. 7 is shown in the switch actuated position. Although not shown in FIG. 7, it should be understood that the springs 40 and 42 are placed at the opposite sides of the rocker actuators to bias the actuator in a clockwise direction. FIG. 7 depicts the actuators operated to connect battery B to motor M through fuse F, stationary contacts 8 and 10 and movable contact 20. Release of the actuators causes the movable contacts 20 and 22 to move to their opposite positions whereby contact 20b separates from stationary contact 10 and contact element 20a engages stationary contact 6 to connect a dynamic resistance 54' in a regenerative loop around motor M through contact assemblies 6 and 8 and movable contact 20. Movable contact 22a also closes on stationary contact 14 to connect a pair of resistors 60 and 62 in parallel with resistor 54' to further serve as a dynamic braking resistance. Resistor 60 is a thermistor wherein heat generated by current flow through the resistor will diminish the resistance thereof. This feature has no particular significance to the dynamic braking function, but does figure in as a time delay feature in the event the movable contact 20b and stationary contact 10 weld and do not open when the switch is operated to the opposite condition. With contacts 20b and 10 welded, and movable contact element 20a and stationary contact 14 closed, fuse F is connected directly to battery B in shunt of motor M through the parallel resistor network 60–62. The resistance of this resistor network is sufficient to prevent fuse F from seeing a major increased current adequate to cause fuse F to blow until the resistance in resistor 60 decreases due to temperature rise therein, at which time fuse F will blow and open the circuit to the battery B.

FIG. 8 depicts an electronic time delay alternate version wherein fuse F and battery B are connected in series to stationary contact assembly 10 similarly to the FIG. 7 embodiment and a dynamic braking resistance network is connected between stationary contact assembly 14 and the motor M and stationary contact assembly 10. An SCR 64 has its anode connected to contact assembly 10 and its cathode connected to one side of motor M. A resistor 66-capacitor 68 are connected around the anode and cathode of SCR 64 to provide $$\frac{d\phi}{dt}$$

protection for the SCR 64. A resistor 70 and capacitor 72 are connected between stationary contact terminal 14 and the point common between motor M and the cathode of SCR 64. A resistor 74 is connected around capacitor 72. A zener diode is connected to a point common between resistor 70 and capacitor 72 in the gate circuit of SCR 64. Operation of the switch to cause movable contact element 20b to separate from stationary contact 10 thereby disconnecting battery B from motor M also causes movable contact element 20a to close upon stationary contact 6, thereby connecting dynamic braking resistance 54'' in a regenerative loop with motor M. Also, closure of movable contact element 22a on stationary contact 14 connects the resistors 70 and 74 in parallel with resistor 541'' in a parallel regenerative loop to be part of a cumulative dynamic braking resistance. In the event contacts 20b and 10 weld and fail to separate upon actuation of the switch 2, contacts 22a and 14a close to connect fuse F in circuit with battery B in shunt of motor M through resistor 70, capacitor 72 and resistor 74. These resistances do not provide sufficient current to fuse F to permit fuse F to blow. However, as capacitor 72 charges up to a voltage which exceeds the breakover voltage of zener diode 76, it triggers SCR 64 into conduction which directly connects fuse F to battery B and causes the fuse to blow. This time delay is determined by the R-C charging constant of resistor 70 and capacitor 72.

The foregoing has described an improved motor control for a battery operated motor which incorporates a fuse in circuit with the battery and the motor, detects a welded contact condition, and operates to take the motor out of the circuit with the fuse and battery and thereby connect the fuse directly across the battery such that increased current flow through the fuse causes the fuse to blow and open the circuit to the motor. A switch is provided that has a sequential contact operation and a pair of independently operated actuators for actuating separate poles of the two-pole switch wherein a welded contact condition occurring in one pole will not influence the actuation of the other pole. The invention has been shown in its preferred embodiments but it is to be understood that it is susceptible of various modifications without departing from the scope of the appended claims.

I claim:
1. A motor control comprising:
   an electric power source;
   a motor;
   current responsive circuit interrupter means in circuit with said source and said motor;
   first switch means operable between closed and open conditions for selectively connecting and disconnecting, respectively, said motor to said source;
   second switch means operable substantially coincidentally with operation from said closed condition to said open condition of said first switch means for connecting a shunt path around said motor in the event said first switch means remains in said closed condition when operated toward said open condition;
   said circuit interrupter means being operable in response to increased current upon establishment of said shunt path for disconnecting said motor from said source.

2. The motor control defined in claim 1 wherein said second switch means is operable for connecting a closed loop regenerative circuit around said motor when said first switch means is operated to said open condition.

3. The motor control defined in claim 2 wherein said closed loop regenerative circuit comprises a dynamic braking resistance.

4. The motor control defined in claim 3 wherein said shunt path around said motor also shunts said dynamic braking resistance.

5. The motor control defined in claim 1 wherein said current responsive circuit interrupter means comprises a fuse.

6. The motor control defined in claim I wherein said first and second switch means comprise first and second rocker switches, respectively, disposed side-by-side, said rocker switches having rocker operators juxtaposed for coincident operation and biased to a mutual first position whereat said first switch means is in said open condition and said second switch means is connecting a closed loop path around said motor.

7. The motor control defined in claim 6 wherein said rocker switches each comprise a movable contact pivotally supported intermediate its ends on a stationary contact, and driver means on said operator biased against said movable contact, said driver means being reciprocally movable by said operator across said pivotal support for rocking said movable contact between respective contact positions.

8. The motor control defined in claim 7 wherein said stationary contacts providing said pivotal support are offset from each other in a direction of driver means movement wherein said driver means of one of said switches moves across a respective said pivotal support effecting movable contact rocking before said driver means of the other of said switches moves across a respective said pivotal support.

9. The motor control defined in claim 8 wherein said closed loop path around said motor comprises a dynamic braking resistor.

10. The motor control defined in claim 9 wherein movable contact of said second rocker switch is a double-throw contact connecting said motor to contacts of said first switch means around said dynamic braking resistor in a second position of said rocker operator of said second rocker switch.

11. The motor control defined in claim 10 wherein contacts of said second rocker switch close for connecting said motor to said contacts of said first switch means prior to closure of contacts of said first rocker switch for connecting said motor to said source.

* * * * *